(12) United States Patent
Boelkins

(10) Patent No.: US 6,567,710 B1
(45) Date of Patent: May 20, 2003

(54) PROGRAM-CONTROLLED FLUID SUPPLY SYSTEM AND CONTROLLER THEREFOR

(76) Inventor: Charles W. Boelkins, 1188 Kirk Dr. SE., Grand Rapids, MI (US) 49546

( * ) Notice: Subject to any disclaimer, the term of this patent is extended or adjusted under 35 U.S.C. 154(b) by 0 days.

(21) Appl. No.: 09/517,044

(22) Filed: Mar. 2, 2000

(51) Int. Cl.⁷ .............................................. G05B 13/02
(52) U.S. Cl. .................. 700/46; 700/282; 700/283; 137/87.03; 184/7.4; 184/17; 222/544
(58) Field of Search ......................... 700/46, 282, 283; 137/2, 8–9, 13, 87.03; 222/594–595, 544–545, 52, 56, 61; 184/7.4, 8, 14, 15.1, 17

(56) References Cited

U.S. PATENT DOCUMENTS

| | | | | |
|---|---|---|---|---|
| 5,182,720 A | * | 1/1993 | Beck et al. ................. | 700/282 |
| 5,316,181 A | * | 5/1994 | Burch ......................... | 222/61 |
| 5,476,546 A | * | 12/1995 | Zibulla ....................... | 118/668 |
| 5,730,819 A | * | 3/1998 | Retti ........................... | 156/71 |
| 5,865,224 A | * | 2/1999 | Ally et al. ................... | 141/130 |
| 6,167,318 A | * | 12/2000 | Kizer et al. ................. | 700/83 |
| 6,405,810 B1 | * | 6/2002 | Grach et al. ................. | 175/52 |
| 2002/0063018 A1 | * | 5/2002 | Schippers ................... | 184/15.1 |

* cited by examiner

*Primary Examiner*—Ramesh Patel
*Assistant Examiner*—Crystal J. Barnes
(74) *Attorney, Agent, or Firm*—Price Heneveld Cooper DeWitt & Litton (57) ABSTRACT

A fluid supply system controller includes a processor, a memory subsystem and fluid application code. The memory subsystem is coupled to the processor and stores data and instructions. The fluid application code causes the processor to perform the steps of receiving a workpiece width, a workpiece feed length, a workpiece stroke rate, a workpiece fluid thickness and a calibrated flow rate. The fluid application code then causes fluid to be periodically provided to the workpiece for a fixed duration responsive to the received workpiece width, workpiece feed length, workpiece stroke rate, workpiece fluid thickness and calibrated flow rate.

20 Claims, 9 Drawing Sheets

PROGRAM-CONTROLLED FLUID SUPPLY SYSTEM AND CONTROLLER THEREFOR

BACKGROUND OF THE INVENTION

The present invention relates generally to fluid supply systems for delivering various fluids to target objects such as workpieces. More particularly, the invention relates to program-controlled, and programmable systems, for delivering metered quantities of fluid such as lubricants to workpieces or workstock in manufacturing or other industrial operations.

Various industrial processes involve advancing a continuous supply of material (generically, a "workpiece") which is processed in various ways to produce a finished product. Throughout various stages of manufacture, the workpiece often requires the application of fluids, e.g., lubricants, or coolants. Existing fluid supply systems have included die lubricant applicators for distributing lubricants from a pressurized source of lubricant in an automated or programmed manner, using various types of control means. For example, some such known systems (e.g., U.S. Pat. Nos. 3,619,709 and 5,205,378) deliver lubricant to one or more injector nozzles on a die press or the like by using fluid pressure or the like as the primary control parameter. The first-mentioned such system, as well as others, utilized solenoid operated valves for selectively gating the flow of lubricant to the injector nozzles at the die press. Other such systems (e.g., U.S. Pat. No. 5,531,085) use a programmable logic controller that cause the solenoid valves to be actuated for a period responsive to the movement of the die press. In this manner, the systems can (at least theoretically) pass a predetermined volume of lubricant from a pressurized source of lubricant to the injector nozzles at predetermined times. Systems of this latter type may also include a programmable counter capable of inhibiting the opening of a valve for given number of die-press cycles.

Other prior art devices have implemented liquid dispensers for sheet stock or other substantially flat workpieces. A good example of one such prior art device of this type is disclosed in U.S. Pat. No. 5,797,983 titled "CONTACT LUBRICATOR WITH METERED SUPPLY," assigned to the Assignee of the present invention. This device includes a pair of hollow elongated rollers which contact the advancing workpiece and apply liquid lubricant to the workpiece as it passes between the rollers. In this device, a liquid-dispensing apparatus meters a predetermined quantity of the liquid to the rollers, for application to the workpiece by coupling a liquid source to a dispensing tube disposed within and extending axially along the inside of the hollow elongated rollers. The dispensing tube within the rollers has a closed end which causes the liquid to be expelled as a spray in metered quantities through a series of spaced apertures in the dispensing tube. The hollow elongated roller is covered by a resiliently compressible liquid-transmissible outer cover. The sprayed liquid passes through a perforated wall of the roller and is absorbed by the resiliently compressible liquid-transmissible outer cover. In a typical implementation, the apparatus includes oppositely disposed rollers which contact the workpiece from opposite sides to apply liquid to both sides of the workpiece.

In the above-described device, the movement of the workpiece across the rollers causes the rollers to rotate, which in turn causes a pump to reciprocate. The reciprocation of the pump results in metered quantities of fluid being supplied to the rollers. In this embodiment, the pump was directly adjacent to one of the rollers. A rotary cam supplied on an end cap of the roller actuated a piston of the pump. Devices of this nature have been utilized in various metal working operations, such as punching, stamping, blanking, wall-forming, etc.

SUMMARY OF THE INVENTION

In its major aspects the present invention is directed to a fluid supply system that provides fluid to a workpiece. The fluid supply system includes a processor, a memory subsystem and fluid application code. The memory subsystem is coupled to the processor and stores data and instructions for the processor. The fluid application code causes the processor to perform the steps of receiving a workpiece width, a workpiece feed length, a workpiece stroke rate, a workpiece fluid thickness and a calibrated flow rate. The fluid application code then controls the processor to cause fluid to be periodically provided to the workpiece for a fixed duration as a function of the received workpiece width, workpiece feed length, workpiece stroke rate, workpiece fluid thickness and the calibrated flow rate.

These and other features, advantages and objects of the present invention will be further understood and appreciated by those skilled in the art by reference to the following specification, claims and appended drawings.

DESCRIPTION OF THE PREFERRED EMBODIMENT

GENERAL OVERVIEW

The fluid supply system of the present invention provides for better control of fluid application and can significantly decrease the use of excess fluids, together with the cost and environmental concerns associated with excess fluids. Both dry contact switches and/or proximity sensors can be utilized as inputs to the system. Each input to the fluid supply system has a corresponding internal counter. Each internal counter is incremented when an input signal is received on its input. When one of the internal counters reaches a programmable value (e.g., 1 to 255), a corresponding output is energized for a programmable period of time (e.g., 10 ms to 100 s). This occurs after a programmable delay period (e.g., 0 to 100 s), if implemented.

The outputs of the fluid supply system are normally connected to a solenoid operated valve (normally closed) which is supplied fluid by a pressurized fluid source. The system can be configured such that any input can control any output or any combination of outputs. When utilized with presses, one input is typically used to monitor the stroke of the press. When an output is used to control fluid supplied to a roller, its corresponding delay is normally set to zero.

In its basic embodiment, the fluid supply system receives six inputs and provides six outputs. In addition to the six inputs, the fluid supply system includes a reservoir fluid level monitor input and a system air pressure input. With the addition of flow sensors, the flow at each of the outputs can be monitored. An expansion board which includes the capability of receiving eight additional inputs and providing eight additional outputs (as well as monitoring the flow of those eight outputs) can be readily implemented. Optionally, a second expansion board can be utilized to increase the number of inputs and outputs. Thus, the fluid supply system can receive up to 22 inputs and control up to 22 outputs. One of skill in the art will appreciate that additional inputs and outputs can be added, as desired.

In the preferred embodiment, the user interface provides a 21-button keyboard for entering information into the system. A number of jobs can be saved within memory of the system. This allows the user to recall various setups without having to re-enter them. The fluid supply system is equipped to monitor several internal and external alarm conditions and provide an output signal to an external buzzer (or press controller) when an alarm condition exists.

A primer button allows the user to actuate all active outputs in order to prime the rollers or to re-saturate the rollers after they have been allowed to dry out. The primer button only actuates outputs in the current setup which have a count and duration which are greater than zero. In an automatic setup mode, further discussed below, the fluid supply system prompts the user for various entries. After receiving the entries from the user, through the keyboard, the fluid supply system automatically sets the outputs to supply the proper amount of fluid to each individual roller or other applicator device or mechanism.

When in a configuration mode, the user can set various parameters. For example, the user can configure the outputs to define how the outputs of the fluid supply system will be used and which inputs will control them. In this manner, the user can assure that the solenoid of an output that is not being utilized will not be energized. A roller set preferably requires two outputs, one for each roller. When flow sensors have been implemented each individual flow-sensing monitor can be turned on or off utilizing the keypad. The alarm inputs and flow monitors are also typically dry contract switches or proximity sensors.

DETAILED DESCRIPTION

Figure 1:
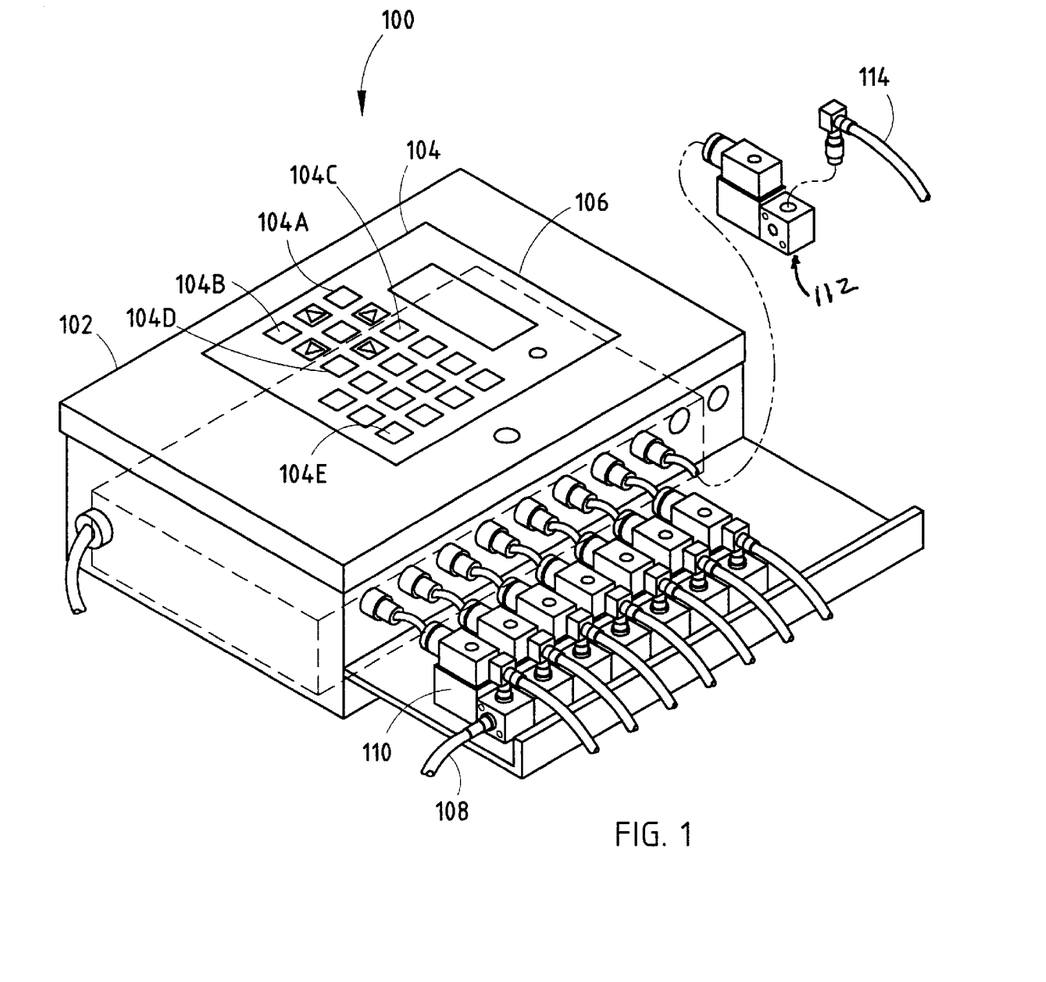
FIG. 1 is a perspective view showing a fluid supply control system, according to an embodiment of the present invention.

FIG. 1 depicts a fluid supply control 100. Fluid supply control 100 includes an enclosure and mounting member 102, a keypad 104, a display 106, a first fluid conduit 108, a valve assembly 110 and a plurality of second fluid conduits 114. If desired, an equalization tube (not shown) can be implemented between opposite ends of valve assembly 110, to equalized the fluid pressure between opposite ends of valve assembly 110. In the preferred embodiment, individual members 112 are joined together (e.g., by bolts running through each member 112) to form valve assembly 110. Thus, members 112 can be added, as desired, for a particular application. Keypad 104 includes an alarm button 104A, an edit button 104B, a configure button 104C, a memory button 104D and an enter button 104E.

Figure 2:
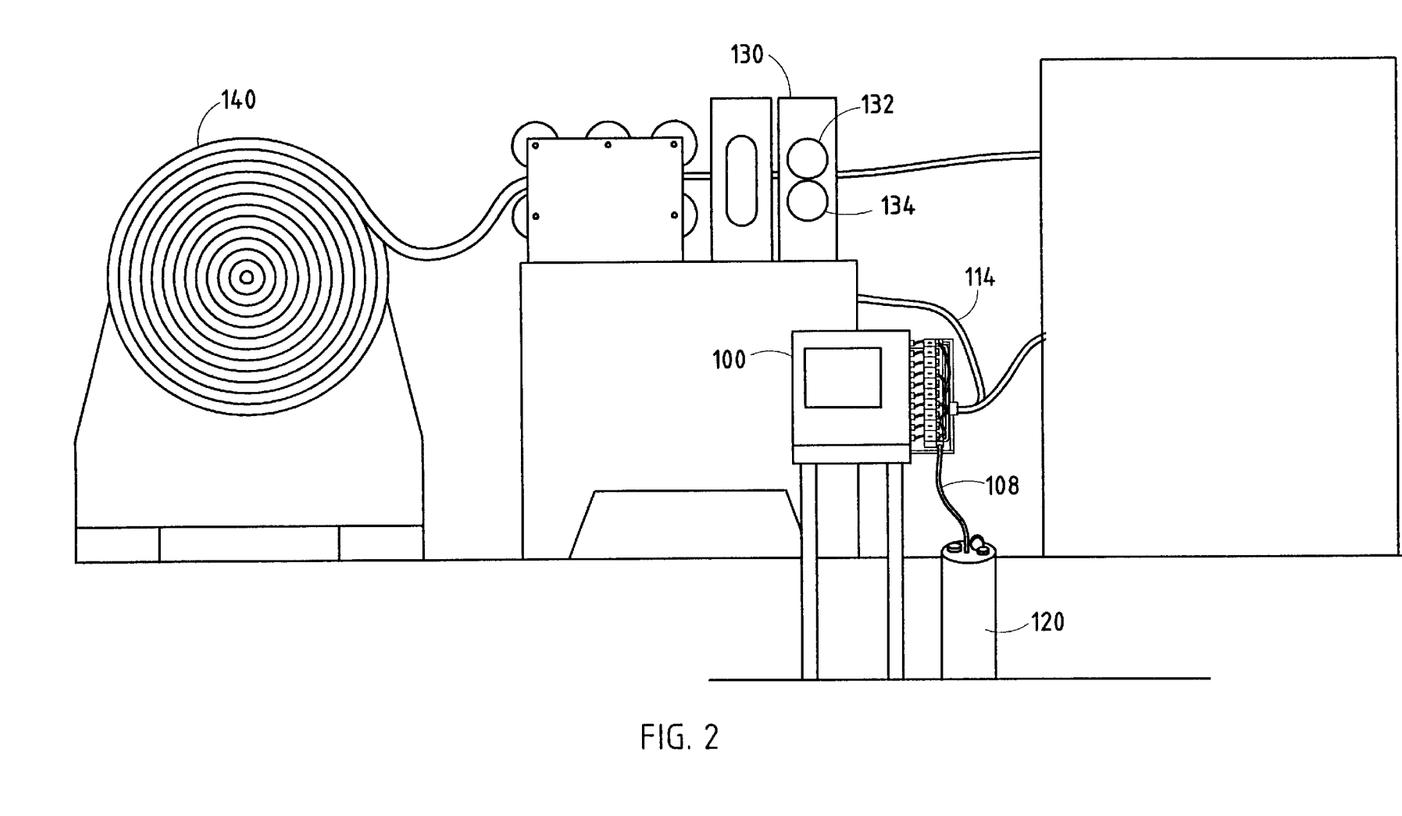
FIG. 2 is a pictorial side elevational view of the fluid supply control panel of FIG. 1 coupled to a pressurized source of fluid which is connected to a roller applicator to deliver fluid thereto, according to an embodiment of the present invention.

FIG. 2 shows fluid supply control 100 controlling fluid from a pressurized source of fluid 120 that is to be delivered to roller applicator 130. As workpiece 140 is fed through roller applicator 130, fluid is provided at the direction of the fluid supply control 100. Fluid supply control 100 receives fluid from pressurized source of fluid 120 through first fluid conduit 108. Fluid is delivered to workpiece 140 through a plurality of second fluid conduits 114.

An upper roller 132 and a lower roller 134, of roller applicator 130, apply fluid to workpiece 140. As previously stated, fluid is delivered to upper roller 132 and lower roller 134 at the direction of fluid supply control 100 through a plurality of second fluid conduits 114. Additionally, fluid supply control 100 can control fluid delivery to other devices (e.g., one or more spray nozzles of a press or the like). Thus, in this manner fluid supply and application can be precisely controlled by fluid supply control 100.

Figure 3:
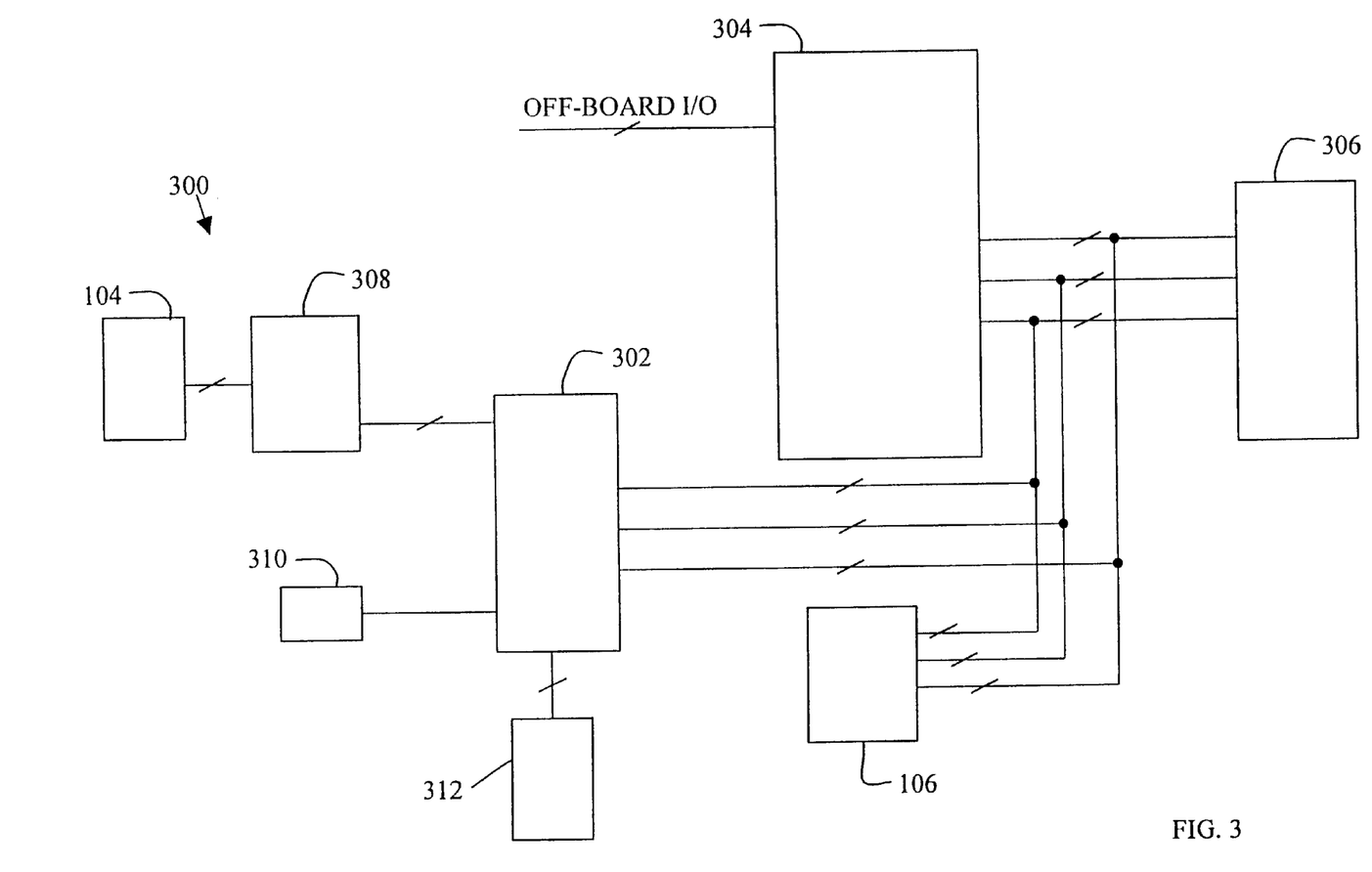
FIG. 3 is block diagram depicting various components of the controller and their interconnections, according to an embodiment of the present invention.

FIG. 3 is a block diagram of a control circuit 300 included within fluid supply control 100. Control circuit 300 includes a processor 302, a complex programmable logic device (CPLD) 304, a memory subsystem 306, a keypad decoder 308, a monitor chip 310 and an external communication chip 312. Processor 302 is coupled to keypad decoder 308, monitor chip 310, display 106, CPLD 304, memory subsystem 306, and external communication chip 312. In the preferred embodiment, processor 302 is a 80C652 8-bit microcontroller manufactured by the Philips Corporation. In the context of this patent, the term "processor" may include a general purpose processor, a microcontroller (i.e., an execution unit with memory, etc., integrated within a single integrated circuit), a digital signal processor or a programmable logic array.

Keypad decoder 308 is preferably a Z86E04 microcontroller manufactured by the Zylog Corporation. The Z86E04 is a one-time programmable microcontroller unit that allows for easy software development, debugging and prototyping and is typically used in an application where it is not feasible to implement a masked ROM. In the disclosed embodiment, monitor chip 310 is a DS1232 manufactured by Dallas Semiconductor Corporation. The DS1232 is capable of monitoring a power supply, software execution and an external override switch. Thus, processor 302 is reset by monitor chip 310 when a power supply (not shown) malfunctions, a push-button reset control switch (not shown) is asserted or a watchdog timer (not shown) is asserted.

Processor 302, display 106, CPLD 304 and memory subsystem 306 are coupled together through various address, data and control lines. CPLD 304 primarily serves to receive various inputs (from dry contact switches and/or proximity sensors) and provide various outputs to valve assembly 110. In this manner, CPLD 304 receives flow control inputs (if implemented), inputs from dry contact switches and/or proximity sensors and provides outputs to drive solenoids of valve assembly 110. CPLD 304 also receives inputs and flow inputs from expansion boards and provides outputs to the expansion boards, when implemented.

Preferably, all off-board inputs/outputs to CPLD 304 are optically isolated. In the preferred embodiment, CPLD 304 is an XC9572 in-system programmable CPLD manufactured by the Xilinx Corporation. As configured, processor 302 communicates with external devices (e.g., a press) through external communication chip 312. In the disclosed embodiment, display 106 is a DMC-20481 20-character full line display manufactured by the Optrex Corporation.

Figure 4:
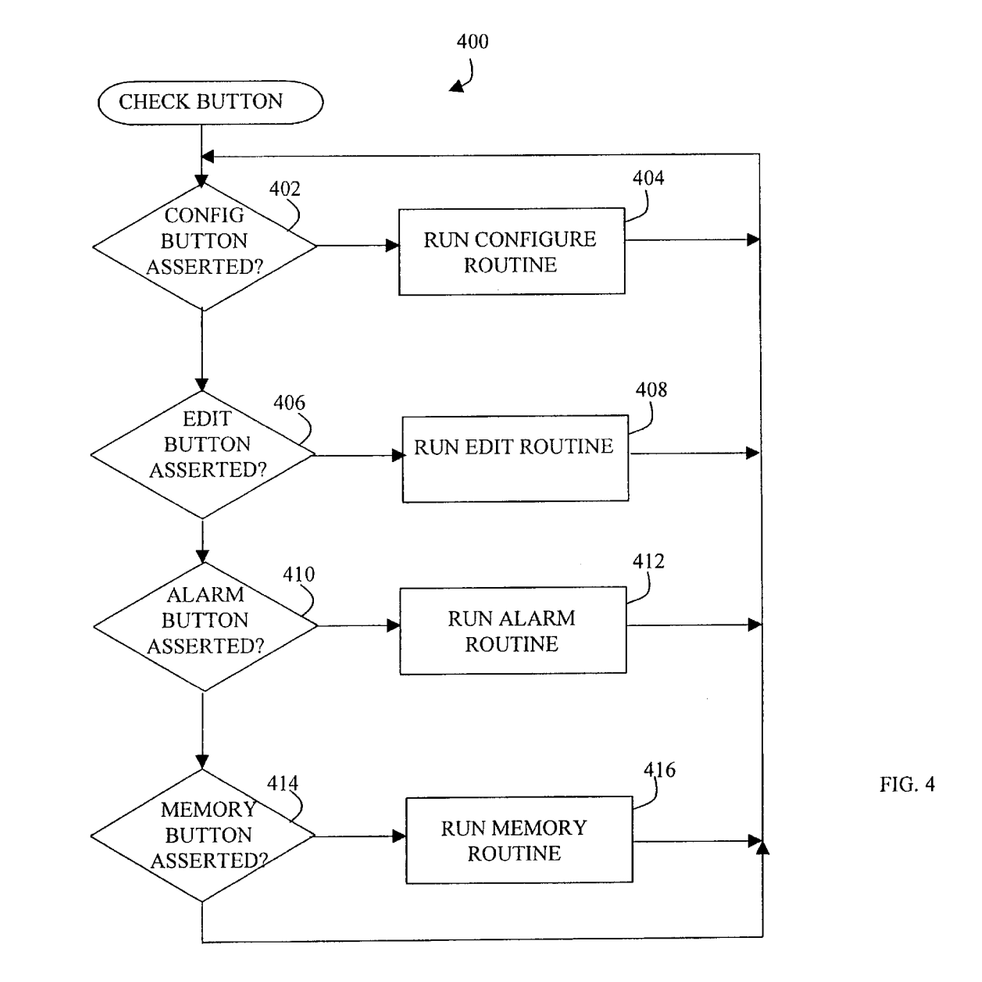
FIG. 4 is a flow chart depicting a Check Button routine, according to an embodiment of the present invention.

FIG. 4 depicts a check button routine 400 that determines when a button of keypad 104 has been asserted. Check button routine 400 periodically determines whether configure button 104C, edit button 104B, alarm button 104A or memory button 104D have been asserted. In step 402, if configure button 104C has been asserted, control transfers to step 404 where a configure routine is run. In step 402, if configure button 104C has not been asserted, control transfers to step 406. In step 406, routine 400 determines whether edit button 104B has been asserted. If edit button 104B has been asserted in step 406, control transfers to step 408 where an edit routine is run. In step 406, if edit button 104B has not been asserted, control transfers to step 410.

In step 410, routine 400 determines whether alarm button 104A has been asserted. If alarm button 104A has been asserted in step 410, control transfers to step 412 where the alarm routine is run. If alarm button 104A has not been asserted in step 410, control transfers to step 414. In step 414, routine 400 determines whether memory button 104D has been asserted. If memory button 104D has been asserted in step 414, control transfers to step 416. In step 416, a memory routine is ran. In step 414, if memory button 104D has not been asserted, control returns to step 402 where the process is repeated while routine 400 is active. When control is returned to steps 404, 408, 412 or 416, check button routine 400 starts the process over again at step 402. Thus, providing the system is active, check button routine 400 periodically monitors configure button 104C, edit button 104B, alarm button 104A and memory button 104D.

Figure 5:
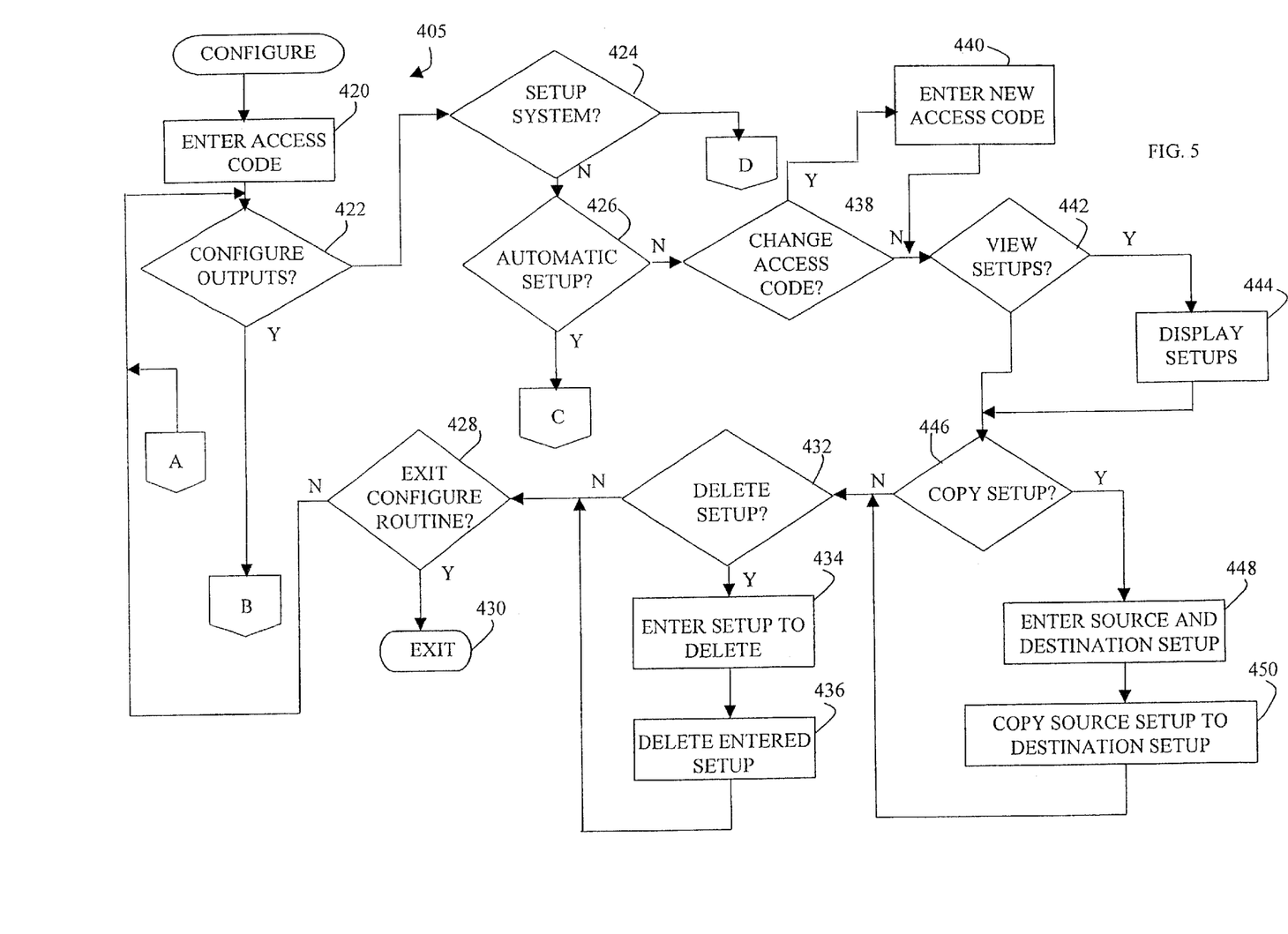
FIGS. 5–8 are flow charts depicting a Configure routine, according to an embodiment of the present invention.

FIG. 5 further depicts configure routine 405. In step 420, the user enters an access code which is compared to a stored access code. Providing the proper access code is entered, control transfers from step 420 to step 422. In step 422, routine 405 determines whether the user has selected to configure the outputs. If so, control transfers to step 452. If not, control transfers from step 422 to step 424. In step 424, routine 405 determines whether the user selected system setup. If so, control transfers to step 502. If not, control transfers from step 424 to step 426. In step 426, the configure routine 405 determines whether the user selected automatic setup. If so, control transfers from step 426 to 470. If not, control transfers from step 426 to step 438. In step 438, routine 405 determines whether the user chose to change the access code. If so, control transfer from step 438 to 440.

In step 440, the user enters a new access code, at which point control transfers to step 442. If the user has not selected to change the access code in step 438, control transfers to step 442. In step 442, routine 405 determines whether the user has chosen to view the setups. If so, control transfers from step 442 to step 444. If not, control transfers from step 442 to step 446. In step 444, the setups are displayed. From step 444, control transfers to step 446. In step 446, routine 405 determines whether the user selected to copy a setup. If so, control transfers from step 446 to step 448. In step 448, the user enters the source and destination setups. From step 448, control transfers to 450. In step 450, routine 405 copies the source setup to the destination setup. From step 450, control transfers to step 432.

If the user did not choose to copy a setup in step 446, control transfers to step 432. In step 432, routine 405 determines whether the user has selected to delete a setup. If so, control transfers from step 432 to step 434. In step 434, the user enters a setup to be deleted. From step 434, control transfers to step 436. In step 436, the setup entered by the user in step 434 is deleted. From step 436, control transfers to step 428. In step 432, if the user does not choose to delete a setup, control transfers to step 428. From step 428, routine 405 determines whether the user has chosen to exit configure routine 405. If so, control transfers to step 430, where configure routine 405 is exited and control is returned to step 402. In step 428, if the user has not chosen to exit configure routine 405, control transfers to step 422. In step 442, the process previously described is repeated while routine 405 is active.

Figure 6:
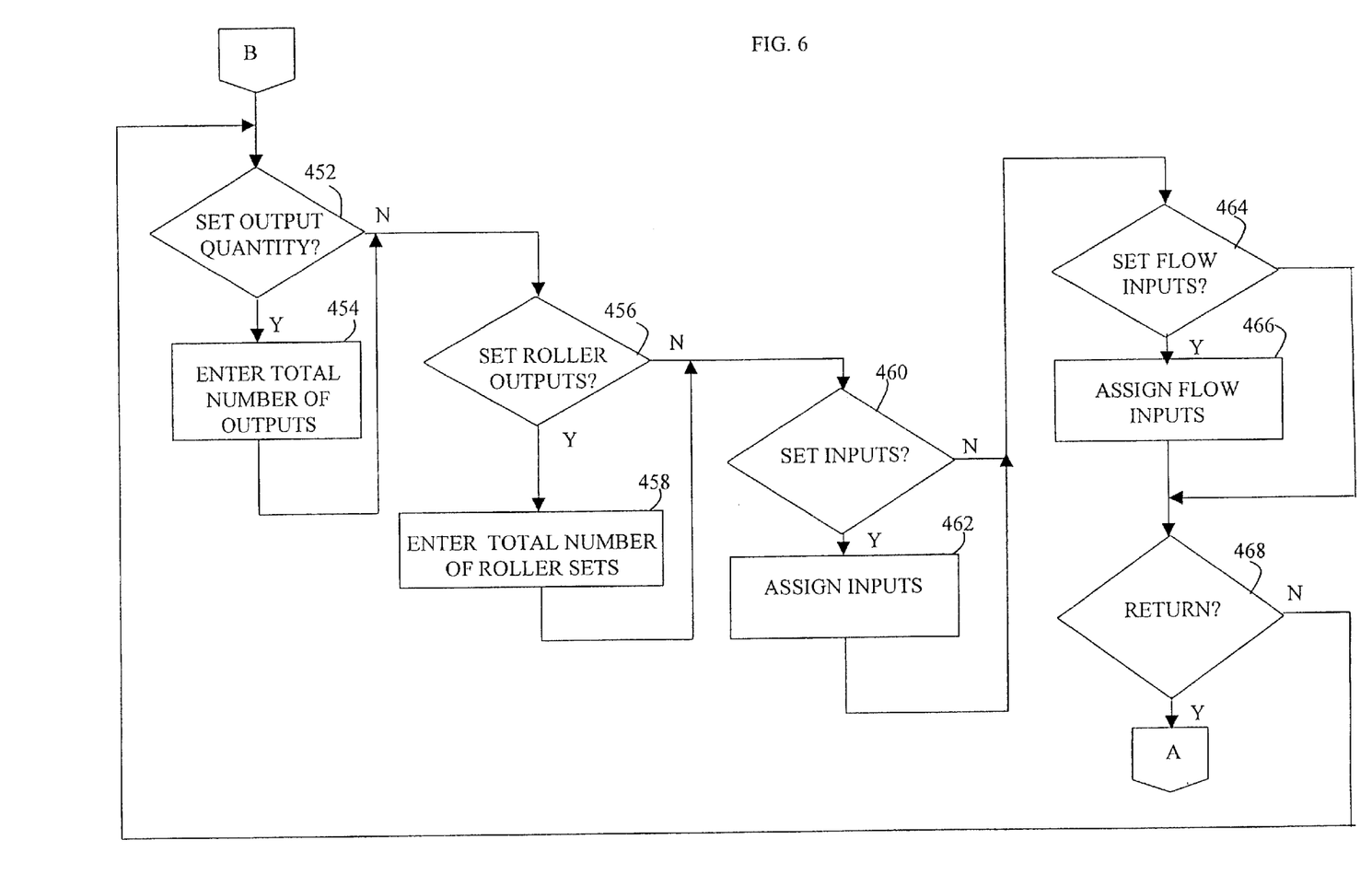

In step 422, when routine 405 determines that the user has chosen to configure the outputs, control transfers to step 452 (see FIG. 6). By choosing to configure the outputs, the user can define how the outputs of the system will be used and which input will control a given output or group of outputs. In step 452, routine 405 determines whether the user has chosen to set the output quantity. If so, control transfers to step 454 where the user selects which outputs are active (i.e., which outputs are connected to a corresponding solenoid operated valve). From step 454, control transfers to step 456. In step 452, if routine 405 determines that the user has not chosen to set the output quantity, control transfers to step 456.

In step 456, routine 405 determines whether the user has chosen to set the roller outputs. In step 456, if the user has chosen to set the roller outputs, control transfers to step 458. In step 458, the user provides the total number of desired roller sets to routine 405. Each roller set requires two system outputs (one for an upper roller and one for a lower roller). If the system is set for one or more roller sets, the system assigns the first outputs to roller sets. For example, if the system is set for six total outputs and two roller sets, the first four outputs are reserved for rollers. In step 456, if the user did not choose to set the roller outputs, control transfers to step 460.

In step 460, routine 405 determines whether the user has chosen to set the inputs. If so, control transfers from step 460 to step 462. In step 462, the user configures a given input by entering which output(s) the given input is to control. From step 462, control transfers to step 464. From step 460, if the user did not choose to setup the inputs, control transfers from step 460 to step 464. In step 464, routine 405 determines whether the user has chosen to set the flow inputs. If so, control transfers from step 464 to step 466. In step 466, the user enters the desired state (on or off) of a given flow input for each active output. From step 466, control transfers to step 468. In step 464, if the user has not chosen to set the flow inputs, control transfers from step 464 to step 468. From step 468, routine 405 determines whether control should return to step 422 or step 452.

Figure 7:
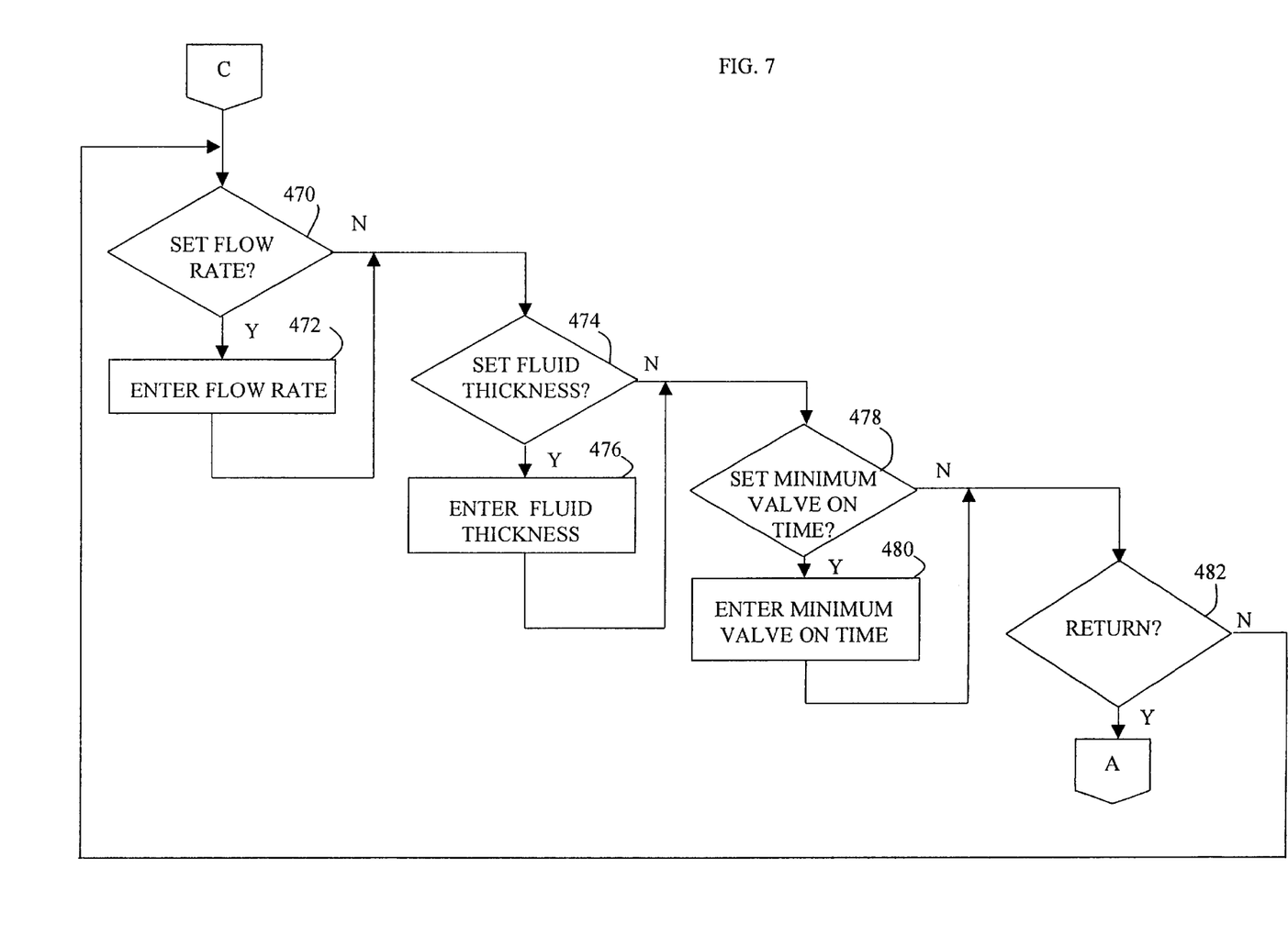

From step 426, when routine 405 determines that the user has chosen automatic setup, control transfers to step 470 (see FIG. 7). Any changes made by a user in automatic setup mode only affect new setups (not existing setups). In step 470, routine 405 determines whether the user has chosen to set the flow rate. If so, control transfers from step 470 to step 472. If not, control transfers from step 470 to step 474. In step 472, routine 405 receives a flow rate input from the user. The flow rate entered is the value determined previously during empirical flow calibration. From step 472, control transfers to step 474. In step 474, routine 405 determines whether the user has selected to set the thickness of the applied fluid. If so, control transfers from step 474 to step 476. In step 476, routine 405 receives a fluid thickness input from the user and then transfers control to step 478.

In step 478, routine 405 determines whether the user has chosen to set the minimum valve on-time. If so, control transfers from step 478 to step 480. In step 480, routine 405 receives a minimum valve on-time input from the user. From step 480, control transfers to step 482. In step 478, if routine 405 determines that the user has not chosen to set the minimum valve on-time, control transfers to step 482. In step 482, routine 405 determines, based on input from the user, whether control should transfer to step 422 or step 470.

Figure 8:
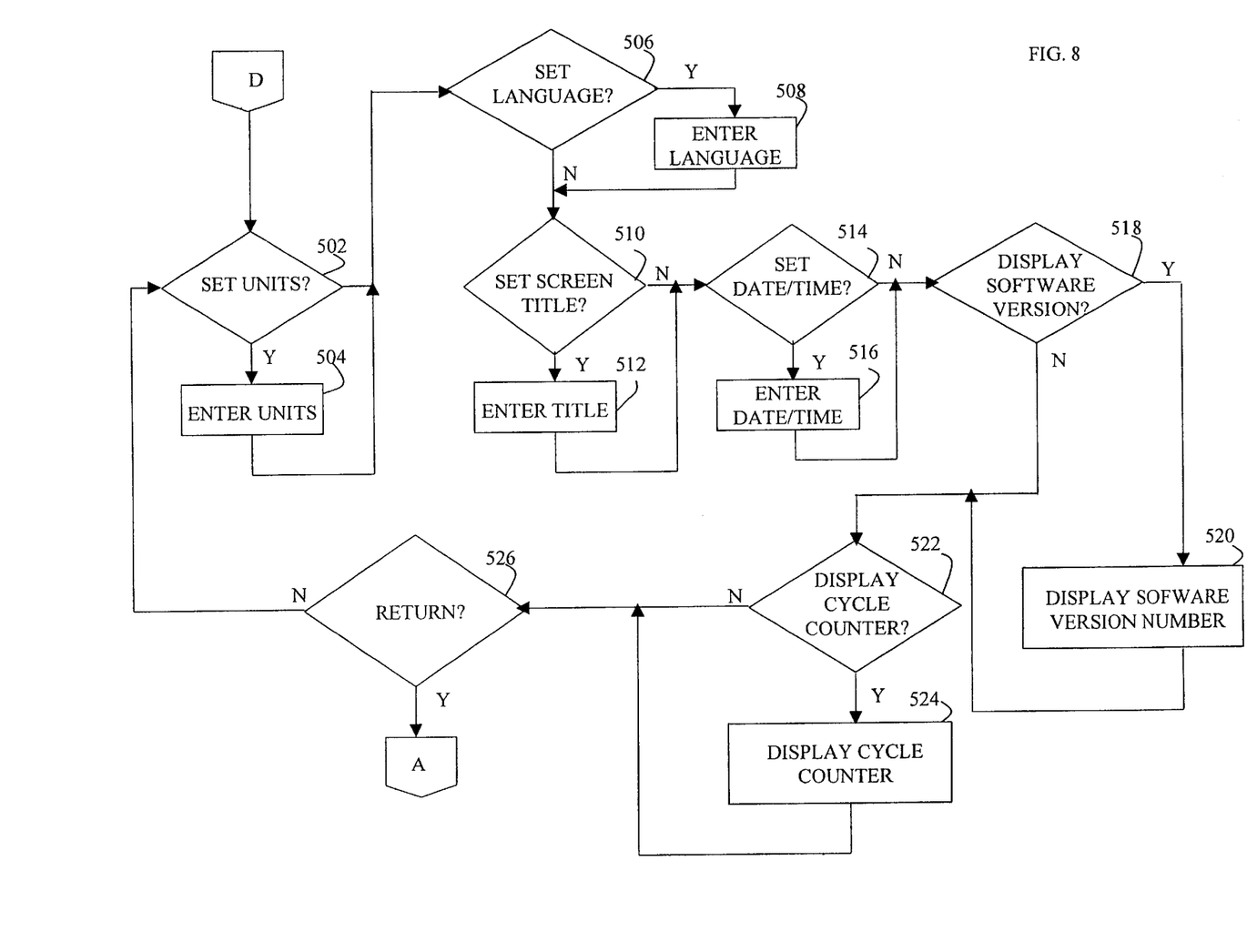

If the user selects to setup the system in step 424, control transfers to step 502 (see FIG. 8). In step 502, routine 405 determines whether the user has chosen to set the units. If so, control transfers to step 504, where the user enters the units (e.g., inches or centimeters). From step 504, control transfers to step 506. In step 502, if routine 405 determines the user did not choose to set the units, control transfers to step 506. In step 506, routine 405 determines whether the user has chosen to set the language. If so, control transfers to step 508, where routine 405 receives the language to be utilized. From step 508, control transfers to step 510. In step 506, if routine 405 determines that the user has not chosen to set the language, control transfers to step 510.

In step 510, routine 405 determines whether the user has chosen to set the screen title. If so, control transfers from step 510 to step 512. In step 512, routine 405 receives changes to the title from the user. From step 512, control transfers to step 514. In step 510, if routine 405 determines that the user has not chosen to set the screen title, control transfers to step 514. In step 514, routine 405 determines whether the user has chosen to set the date and the time. If so, control transfers from step 514 to step 516. In step 516, routine 405 receives a date and/or time from the user. From step 516, control transfers to step 518. In step 514, if routine 405 determines that the user has not chosen to set the date and time, control transfers to step 518.

In step 518, routine 405 determines whether the user has chosen to display the software version identification number. If so, control transfers from step 518 to step 520. In step 520, routine 405 displays a software version number. From step 520, control transfers to step 522. In step 518, if routine 405 determines that the user has not chosen to display the software version number, control transfers to step 522. In step 522, routine 405 determines whether the user has chosen to display the cycle counter. If so, control transfers from step 522 to step 524. In step 524, routine 405 displays the cycle counter for each output. This display provides maintenance information (i.e., how many times an output has been actuated).

From step 524, control transfers to 526. In step 522, if routine 405 determines that the user has not chosen to display the cycle counter, control transfers to step 526. In step 526, routine 405 determines whether control should transfer to step 422 or step 502. In step 428, when routine 405 determines that the user has chosen to exit configure routine 405, control transfers to step 430 where routine 405 is exited. This transfers control back to check button routine 400 and more specifically to step 402.

Figure 9:
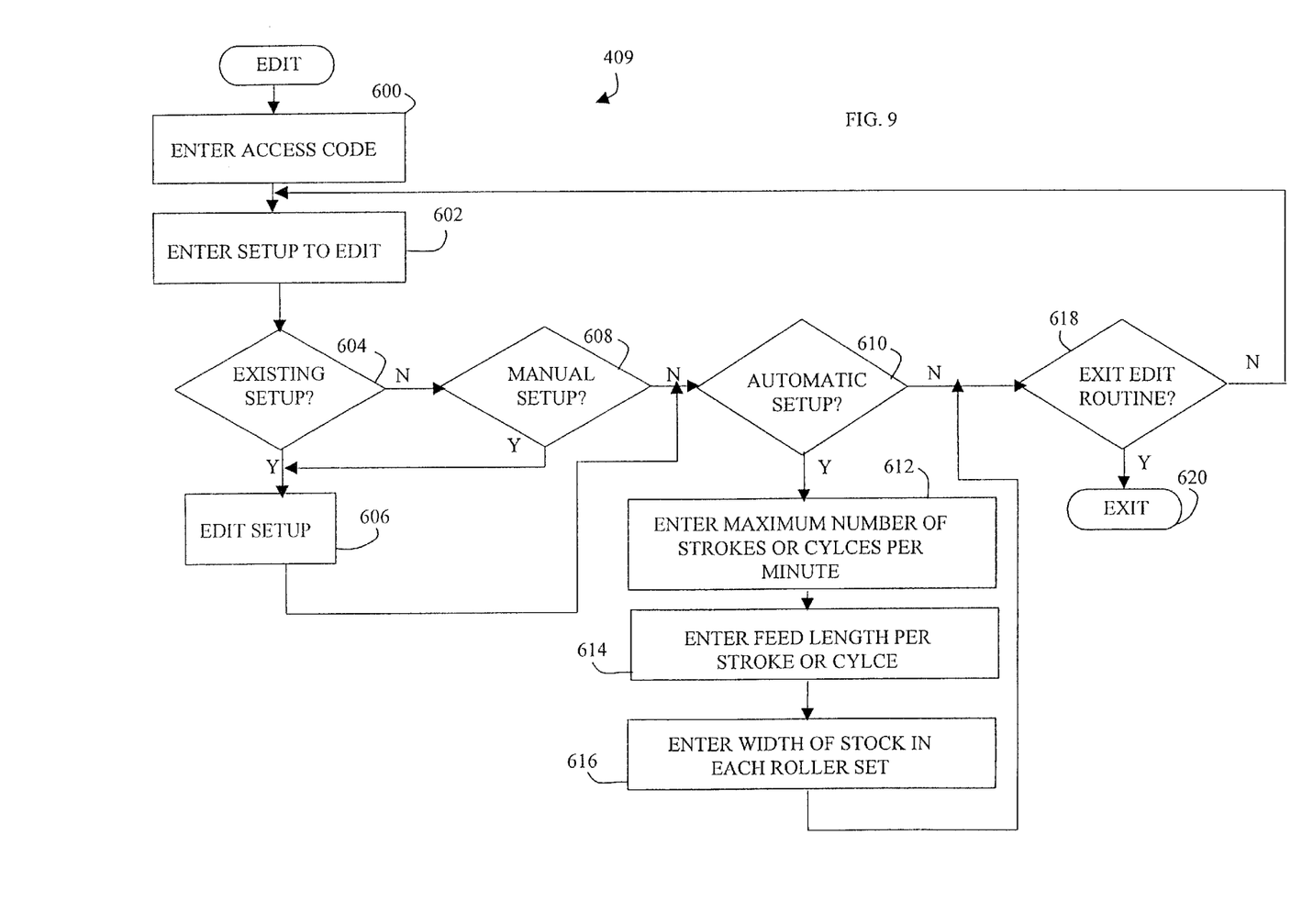
FIG. 9 is a flow chart of an Edit routine, according to an embodiment of the present invention.

FIG. 9 further illustrates edit routine 409. Edit routine 409 is executed when check button routine 400 determines in step 406 that edit button 104B has been asserted by the user. In step 600, routine 409 receives an access code from the user. When a proper access code is entered, control transfers from step 600 to step 602. In step 602, routine 409 receives input from the user which corresponds to the set-up which is to be edited. From step 602, control transfers to step 604. In step 604, routine 409 determines whether the setup to be edited is an existing setup. If so, control transfers from step 604 to step 606. If not, control transfers from step 604 to step 608. In step 608, if the user selects manual setup, control transfers from step 608 to step 606. If not, control transfers from step 608 to step 610. In step 606, routine 409 receives the edits of the setup from the user. From step 606, controls to step 610.

In step 610, routine 409 determines whether the user has selected automatic setup. If so, control transfers from 610 to step 612. If not, control transfers from step 610 to step 618. In automatic setup mode, the system calculates an appropriate output setting for a given output. In step 612, routine 409 receives the maximum number of strokes or cycles per minute from the user. From step 612, control transfers to step 614. In step 614, the user enters the feed length per stroke (e.g., the length of material that is fed through a set of rollers between consecutive input signals). From step 614, control transfers to step 616. In step 616, the user enters the width of the material in each roller set. From step 616, control transfers to step 618. In step 618, routine 409 determines whether to transfer control to step 602 or step 620. If routine 409 is to be exited, control transfers to step 620. Otherwise, control transfers to step 602. From step 620, control returns to step 402 where check button routine 400 is resumed.

A fluid supply system, as described above, advantageously allows a user of the system to more precisely control the application of fluid to a workpiece. The fluid supply system receives various inputs from a user. These inputs include a workpiece width, a workpiece feed length, a workpiece stroke rate (i.e., strokes per minute), a workpiece fluid thickness and a calibrated flow rate for a given output. In response to these inputs, the fluid supply system determines when and how long fluid is applied to the workpiece. Initially, cycle rate (c_rate) is determined, in seconds per stroke. The cycle rate is defined to be equal to sixty divided by the workpiece stroke rate (s_rate) (c_rate=60/s_rate).

A minimum flow rate (min_flow) is then determined for each roller set. The minimum flow rate is equal to the workpiece feed length (f_leng) times the workpiece fluid thickness (f_thic) divided by the cycle rate times the workpiece width (w_wid) (min_flow=(((f_leng*f_thic)/c_rate)w_wid)). An output on-time (on_time) is then determined for each roller set. The output on-time is equal to the workpiece width times the workpiece feed length times the workpiece fluid thickness divided by the calibrated flow rate (c_flow) (on_time=(w_width*f_leng*f_thic)/c_flow). If the output on-time is greater than the cycle rate, then the output would be on for greater than a cycle. This means the calibrated flow rate is insufficient to deliver the proper amount of fluid. Accordingly, the system advises the user that the calibrated flow rate must be increased. This is accomplished by increasing the pressure of the pressurized source of fluid.

On the other hand, if an output on-time is determined to be less than the minimum on-time (typically determined by the solenoid utilized), the output on-time is multiplied by a counter value. The counter is then incremented until the output on-time is greater than the minimum on-time (at which point an appropriate number of cycles, equal to the counter value, are skipped between fluid output). However, if the counter exceeds a predetermined value, in this case 255 (dictated by the hardware used), the system advises the user to increase the minimum on-time or decrease the calibrated flow rate. The calibrated flow rate can be decreased by decreasing the pressure of the pressurized source.

The above description is considered that of the preferred embodiments only. Modifications of these embodiments may occur to those skilled in the art and to those who make or use the invention after learning of it from or through the present inventors. Therefore, it is to be understood that the embodiments shown in the drawings and described above are merely for illustrative purposes and these should not be used to limit the scope of the invention, which is defined by the following claims as interpreted according to the principles of patent law, including the doctrine of equivalents.

What is claimed is:

1. A fluid supply system for delivering fluid to a workpiece, comprising:
   a processor;
   a memory subsystem coupled to the processor and storing data and instructions;
   fluid application code for causing the processor to perform the steps of:
      receiving a workpiece width;
      receiving a workpiece feed length;
      receiving a workpiece stroke rate;
      receiving a workpiece fluid thickness;
      receiving a calibrated flow rate; and
      periodically providing fluid to the workpiece for a fixed duration responsive to the received workpiece width, workpiece feed length, workpiece stroke rate, workpiece fluid thickness and calibrated flow rate;
   a pressurized source of fluid;
   a valve assembly including a plurality of processor actuated valves;
   a first fluid conduit coupling the pressurized source of fluid to the valve assembly; and
   a plurality of second fluid conduits each coupling one of the plurality of processor actuated valves to one of a plurality of fluid supply devices, wherein each of the fluid supply devices provides fluid to the workpiece responsive to the processor.

2. The fluid supply system of claim 1, wherein the fluid application code causes the processor to perform the additional steps of:
   determining an on-time for a selected processor actuated valve based in part on the calibrated flow rate;
   determining a cycle rate based in part on the workpiece stroke rate; and
   advising a user to increase the calibrated flow rate, when the on-time for the selected processor actuated valve exceeds the cycle rate.

3. The fluid supply system of claim 2, wherein the fluid application code causes the processor to perform the additional steps of:
   receiving a minimum on-time for the selected processor actuated valve;
   determining whether a proper amount of fluid can be delivered without exceeding a maximum value of an internal input counter that is associated with the selected processor actuated valve; and
   advising a user to decrease the calibrated flow rate or increase the minimum on-time for the selected processor actuated valve, when the proper amount of fluid cannot be delivered through the selected processor actuated valve without exceeding the maximum value of the internal input counter.

4. The fluid supply system of claim 1, wherein the processor is an 8051 compatible microcontroller.

5. The fluid supply system of claim 1, wherein the fluid supply devices are rollers.

6. The fluid supply system of claim 1, wherein the fluid supply devices include spray nozzles.

7. The fluid supply system of claim 1, wherein the fluid supply devices include spray nozzles and rollers.

8. The fluid supply system of claim 1, further comprising:
   a keypad for receiving input from a user; and
   a display for providing information to the user, the display further prompting the user for the input.

9. The fluid supply system of claim 8, the keypad further including:
   an alarm button for causing current alarms to be provided on the display; and
   an edit button for allowing existing set-ups to be changed or new set-ups to be initiated.

10. A method of applying fluid to a workpiece, comprising the steps of:
    receiving a workpiece width;
    receiving a workpiece feed length;
    receiving a workpiece stroke rate;
    receiving a workpiece fluid thickness;
    receiving a calibrated flow rate; and
    periodically providing fluid to the workpiece for a fixed duration responsive to the received workpiece width, workpiece feed length, workpiece stroke rate, workpiece fluid thickness and calibrated flow rate.

11. The method of claim 10, further comprising the additional steps of:
    determining an on-time for a selected processor actuated valve based in part on the calibrated flow rate;
    determining a cycle rate based in part on the workpiece stroke rate; and
    advising a user to increase the calibrated flow rate, when the on-time for the selected processor actuated valve exceeds the cycle rate.

12. The method of claim 11, further comprising the additional steps of:
    receiving a minimum on-time for the selected processor actuated valve;
    determining whether a proper amount of fluid can be delivered without exceeding a maximum value of an internal input counter that is associated with the selected processor actuated valve; and
    advising a user to decrease the calibrated flow rate or increase the minimum on-time for the selected processor actuated valve, when the proper amount of fluid cannot be delivered through the selected processor actuated valve without exceeding the maximum value of the internal input counter.

13. The method of claim 10, wherein the fluid is applied to the workpiece by rollers.

14. The method of claim 10, wherein the fluid is applied to the workpiece by both rollers and spray nozzles.

15. A fluid supply system controller providing for the application of fluid to a workpiece, comprising:
    a processor;
    a memory subsystem coupled to the processor and storing data and instructions; and
    fluid application code for causing the processor to perform the steps of:
       receiving a workpiece width;
       receiving a workpiece feed length;
       receiving a workpiece stroke rate;
       receiving a workpiece fluid thickness;
       receiving a calibrated flow rate; and
       periodically providing fluid to the workpiece for a fixed duration responsive to the received workpiece width, workpiece feed length, workpiece stroke rate, workpiece fluid thickness and calibrated flow rate.

16. The fluid supply system controller of claim 15, wherein the fluid application code causes the processor to perform the additional steps of:

determining an on-time for a selected processor actuated valve based in part on the calibrated flow rate;

determining a cycle rate based in part on the workpiece stroke rate; and advising a user to increase the calibrated flow rate, when the on-time for the selected processor actuated valve exceeds the cycle rate.

17. The fluid supply system controller of claim 16, wherein the fluid application code causes the processor to perform the additional steps of:

receiving a minimum on-time for the selected processor actuated valve;

determining whether a proper amount of fluid can be delivered without exceeding a maximum value of an internal input counter that is associated with the selected processor actuated valve; and advising a user to decrease the calibrated flow rate or increase the minimum on-time for the selected processor actuated valve, when the proper amount of fluid cannot be delivered through the selected processor actuated valve without exceeding the maximum value of the internal input counter.

18. The fluid supply system controller of claim 15, wherein the fluid is applied to the workpiece by rollers.

19. The fluid supply system controller of claim 15, wherein the fluid is applied to the workpiece by both rollers and spray nozzles.

20. The fluid supply system controller of claim 15, wherein the processor is an 8051 compatible microcontroller.

* * * * *

UNITED STATES PATENT AND TRADEMARK OFFICE
CERTIFICATE OF CORRECTION

PATENT NO. : 6,567,710 B1
DATED : May 20, 2003
INVENTOR(S) : Charles W. Boelkins It is certified that error appears in the above-identified patent and that said Letters Patent is hereby corrected as shown below:

<u>Title page,</u>
Item [76], Inventor, "1188 Kirk Dr. SE., Grand Rapids, MI (US) 49546" should be -- 325 Preservation Dr., Ada, MI (US) 49301 --.

Signed and Sealed this

Eighteenth Day of November, 2003

JAMES E. ROGAN
*Director of the United States Patent and Trademark Office*